(12) United States Patent
de los Santos et al.

(10) Patent No.: US 7,370,361 B2
(45) Date of Patent: May 6, 2008

(54) SYSTEM AND METHOD FOR SECURING COMPUTERS AGAINST COMPUTER VIRUS

(75) Inventors: Aldous C. de los Santos, Pasig (PH); Richard T. Fernandez, Pasig (PH); Rodelio G. Finones, Bulacan (PH)

(73) Assignee: Trend Micro Incorporated, Tokyo (JP)

( * ) Notice: Subject to any disclaimer, the term of this patent is extended or adjusted under 35 U.S.C. 154(b) by 672 days.

(21) Appl. No.: 10/899,380

(22) Filed: Jul. 26, 2004

(65) Prior Publication Data

US 2005/0177736 A1   Aug. 11, 2005

Related U.S. Application Data

(60) Provisional application No. 60/542,334, filed on Feb. 6, 2004.

(51) Int. Cl.
*G06F 21/06* (2006.01)

(52) U.S. Cl. .................... 726/24; 713/187; 713/188

(58) Field of Classification Search ............... 713/200, 713/187, 188; 726/24
See application file for complete search history.

(56) References Cited

U.S. PATENT DOCUMENTS

| | | | |
|---|---|---|---|
| 5,442,699 A | 8/1995 | Arnold et al. | |
| 5,452,442 A | 9/1995 | Kephart | |
| 5,623,600 A * | 4/1997 | Ji et al. | 726/24 |
| 5,907,834 A | 5/1999 | Kephart et al. | |
| 6,192,512 B1 | 2/2001 | Chess | |
| 6,279,128 B1 | 8/2001 | Arnold et al. | |
| 6,622,134 B1 | 9/2003 | Sorkin | |
| 6,711,583 B2 | 3/2004 | Chess et al. | |
| 6,789,200 B1 | 9/2004 | Fiveash et al. | |
| 6,813,712 B1 | 11/2004 | Luke | |
| 6,851,057 B1 * | 2/2005 | Nachenberg | 726/24 |
| 6,971,019 B1 * | 11/2005 | Nachenberg | 713/188 |
| 7,203,959 B2 * | 4/2007 | Nachenberg et al. | 726/22 |
| 2002/0073330 A1 | 6/2002 | Chandnani et al. | |
| 2003/0033536 A1 | 2/2003 | Pak et al. | |

FOREIGN PATENT DOCUMENTS

| | | |
|---|---|---|
| EP | 1 377 892 B1 | 9/2004 |
| WO | WO 01/69356 A2 | 9/2001 |
| WO | WO 02/084459 A1 | 10/2002 |

OTHER PUBLICATIONS

Aho, Alfred V. et al. "Compilers Principles, Techiniques, and Tools" Bell Telephone Laboratories, 1986.

(Continued)

*Primary Examiner*—Kim Y. Vu
*Assistant Examiner*—Edward Zee
(74) *Attorney, Agent, or Firm*—Okamoto & Benedicto LLP

(57) ABSTRACT

In one embodiment, an antivirus mechanism builds an automaton of a virus using a pattern and a set of rules. The antivirus mechanism may then scan a binary file to detect an engine of the virus by matching the automaton with a plurality of disassembly codes derived from the binary file. The pattern may comprise a data structure including a name of a particular virus, and information for detecting the virus using the disassembly codes.

10 Claims, 8 Drawing Sheets

OTHER PUBLICATIONS

Mihai Christodorescu, "Static Analysis of Executables to Detect Malicious Patterns", Proceedings of the 12th USENIX Security Symposium, Aug. 4, 2008, pp. 169-186, XP002333005, Washington D.C., USA.

Peter Szor and Peter Ferrie, "Hunting for Metamorphic", Virus Bulletin Conference 2001, Sep. 2001, pp. 123-144, XP00233352, England.

PCT Annex to Form PCT/ISA/206 Partial International Search for International Application No. PCT/JP2005/001979.

* cited by examiner

SYSTEM AND METHOD FOR SECURING COMPUTERS AGAINST COMPUTER VIRUS

CROSS-REFERENCE TO RELATED APPLICATION

This application claims the benefit of U.S. Provisional Application No. 60/542,334, entitled "FAST PATTERN-BASED POLYMORPHIC AND METAMORPHIC VIRUS SCANNER", filed by Aldous C. de los Santos, Richard T. Fernandez, and Rodelio G. Finones on Feb. 6, 2004, which is hereby incorporated by reference in its entirety.

BACKGROUND OF INVENTION

1. Field of the Invention

The present invention relates generally to computer systems, and more particularly but not exclusively to techniques for combating computer viruses.

2. Description of the Background Art

The threat posed by computer viruses to computer systems is well documented. A computer virus code can corrupt or delete important files, send e-mails without user authorization, render a computer inoperable, or cause other types of damage to a computer. From the old Disk Operating System (DOS) battlefield to the current Windows 32-bit (Win32) arena, the evolving virus technology has taken the battle between virus writers and antivirus experts to greater heights. Known and skilled virus coders continue to generate new types of viruses that can escape antivirus programs.

Polymorphic viruses are characterized by having the constant part of the virus body (except the data areas) encrypted using different encryption methods. Metamorphic viruses, on the other hand, do not have a decryptor, nor a constant virus body but are able to create new generations that look totally different. Virus code obfuscation on the host program with the use of complex techniques has been a common method of hiding viral codes. Random garbage code (code that does not change the behavior of the program) insertion and do-nothing-loops code generation are among the complex techniques that a clever virus coder uses to build virus codes.

Antivirus product developers are constantly keeping track of the latest virus technology advances. However, most commercial antivirus products are still inadequate in detecting all possible forms of infections given the elusive complexity of viruses. Most of these products rely on an old virus matching technology called "scan string." In this approach, the string represents virus pattern on a specific location of the file. When applied to metamorphic viruses, this method will absolutely fail since metamorphic viruses do not contain any constant scan strings and are mutated throughout its infection generations.

Another conventional technique used to combat viruses is the so-called "byte searching," which is just another form of scan string. In this approach, the antivirus program continuously parses consecutive locations of the file to search for certain byte sequences. The drawback of this approach is that it is too slow, considering that it searches the whole code portion of the file for specific byte sequences. In small files with small code portions, the technique may not yield significant results. But, on large files with large code portions, a noticeable scanning performance drop down will be apparent right away.

An existing method that is used to detect a combination of polymorphic and metamorphic viruses is the so-called "manual decryption." In this technique, the polymorphic decryptor is reversed to come up with the virus-decrypted code. This method also suffers from scanning speed. Because the decryptor of a combination of polymorphic and metamorphic viruses typically does not reside on a fixed location, the antivirus program needs to search for it. Just like byte searching, this method entails too much scanning time overhead.

There are also non-commercial tools that attempt to use geometric detection methods based on modifications that a virus has made to a file structure. These tools check for virus signatures and modifications of section headers, and advantageously filter normal and viral files right away. However, these tools do not provide the exact identification of the virus since they do not derive their detection on the virus code itself. Since the detection is not exact, it is also prone to false positives.

Emulators have also been used to combat computer viruses. Emulators allow virus codes to execute in a controlled environment. The virus codes that are being monitored can then be examined periodically or only when special instructions are executed. The effectiveness of emulators to detect viruses depends on how these emulators are implemented. Aside from metamorphism, any virus could easily place trigger conditions at the start of its code before executing its infection routine. Emulators that follow only one path could easily miss other samples that were not able to execute the infection routine due to the infection condition. Another major drawback of this technique is its scanning speed. When applied to viruses that insert many do-nothing loops before the actual virus code, the detection speed definitely suffers.

SUMMARY

In one embodiment, an antivirus mechanism builds an automaton of a virus using a pattern and a set of rules. The antivirus mechanism may then scan a binary file to detect an engine of the virus by matching the automaton with a plurality of disassembly codes derived from the binary file. The pattern may comprise a data structure including a name of a particular virus, and information for detecting the virus using the disassembly codes.

These and other features of the present invention will be readily apparent to persons of ordinary skill in the art upon reading the entirety of this disclosure, which includes the accompanying drawings and claims.

DETAILED DESCRIPTION

Figure 1:
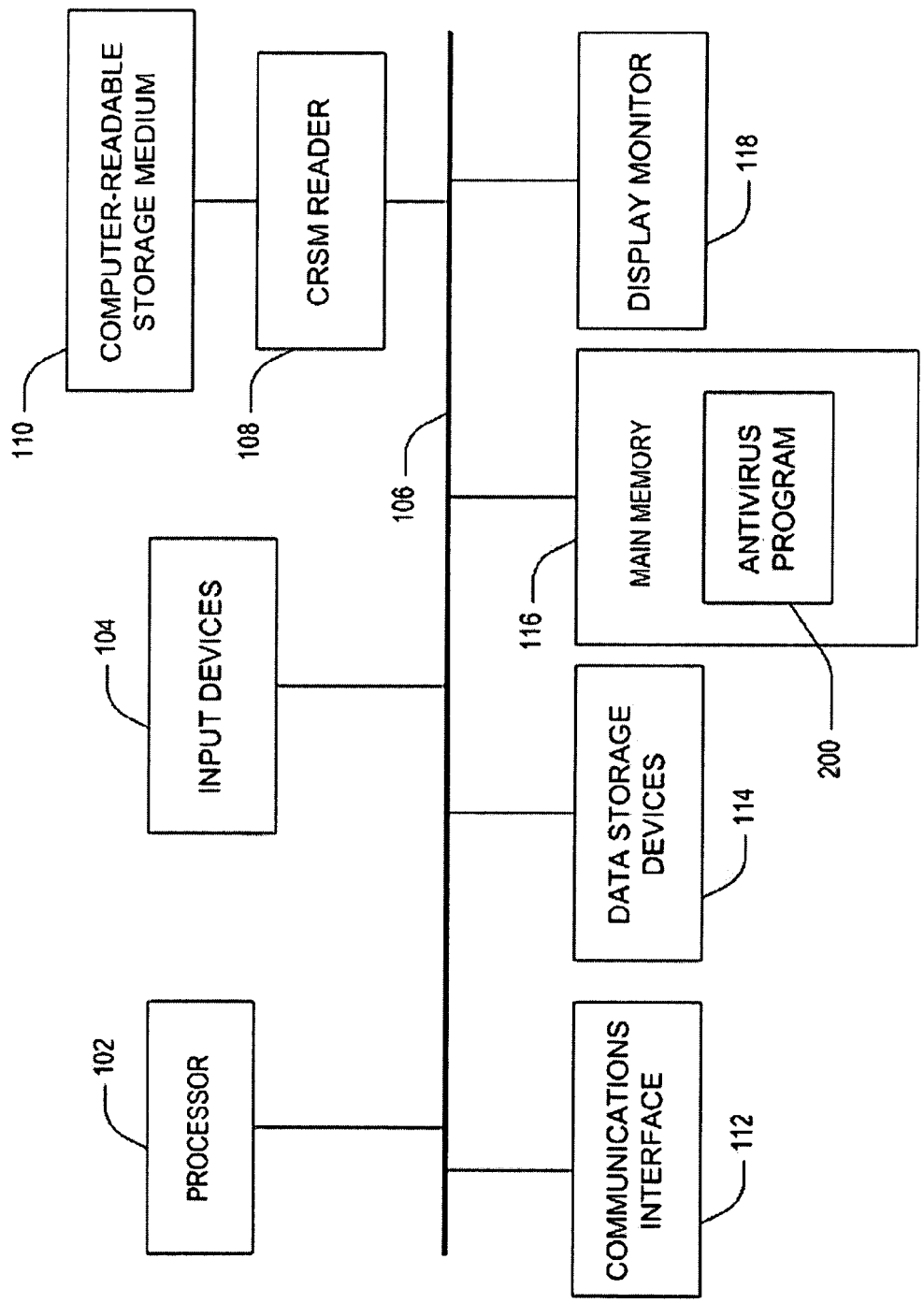
FIG. 1 shows a schematic diagram of an example computer that may be used in embodiments of the present invention.

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific detail. In other instances, well-known details are not shown or described to avoid obscuring aspects of the invention.

Being computer-related, it can be appreciated that the components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable code for performing the function of a particular component. Likewise, computer memory may be configured to include one or more components, which may then be executed by a processor. Components may be implemented separately in multiple modules or together in a single module.

To overcome the inadequacy and inefficiency of existing antivirus technologies in fully detecting polymorphic and metamorphic viruses, the present invention provides an improved polymorphic and metamorphic virus scanner. The improved virus scanner provides the following advantages. Firstly, it allows for generic detection of polymorphic/metamorphic viruses by specifically detecting the polymorphic/metamorphic engine used by the virus. An "engine" of the virus is responsible for creating the mutated codes of the virus that result in a new generation that looks different. Unlike the conventional scan string technology, the improved viruses scanner may use another approach to match the pattern (regular expression-like) using Deterministic Finite Automata ("DFA"). Generally speaking, a "regular expression" is a formula for matching strings that follow a certain pattern, while a DFA may comprise a transition table containing states and corresponding next states. DFA's, in general, are described in "Compilers: Principles, Techniques, and Tools," by Alfred V. Aho, Ravi Sethi, and Jeffrey D. Ulman, published by Addison Wesley, incorporated herein by reference in its entirety. Instead of representing virus pattern with a string or a series of bytes, the improved virus scanner may use actual disassembly code. That is, the improved virus scanner may use actual human-readable assembly language instructions instead of mere bytes and strings.

Secondly, the improved virus scanner improves scanning speed and detection rate. Unlike conventional emulators, which are known to be slow and unable to handle viruses that generate do-nothing loops, the improved virus scanner may treat the virus file as a series of disassembly codes that could be matched with an existing disassembly codes database. A "disassembly code," which is also referred to as an "assembly code," refers to a human-readable code derived by converting binary information contained in an executable file. Assembly and disassembly codes are in the same programming language except that "assembly code" is used to refer to what is provided to an "assembler" for conversion to machine-language, while "disassembly code" is used to refer to an assembly code resulting from "disassembling" machine language. A file containing machine language is also referred to as a "binary file."

The improved virus scanner may automatically terminate the scanning of a file when the current disassembly code does not match any of the disassembly codes on the disassembly code database or when the disassembly code does not belong to the acceptable list of assembly codes for a certain virus. Since detection is based on the disassembly code of the virus, the improved virus scanner allows for exact detection of the virus.

Referring now to FIG. 1, there is shown a schematic diagram of an example computer that may be used in embodiments of the present invention. Depending on its configuration, the computer shown in the example of FIG. 1 may be employed as a desktop computer, a server computer, or an appliance, for example. The computer of FIG. 1 may have less or more components to meet the needs of a particular application. As shown in FIG. 1, the computer may include a processor 102, such as those from the Intel Corporation or Advanced Micro Devices, for example. The computer may have one or more buses 106 coupling its various components. The computer may include one or more input devices 104 (e.g., keyboard, mouse), a computer-readable storage medium (CRSM) 110, a CRSM reader 108 (e.g., floppy drive, CD-ROM drive), a display monitor 118 (e.g., cathode ray tube, flat panel display), a communication interface 112 (e.g., network adapter, modem) for coupling to a network, one or more data storage devices 114 (e.g., hard disk drive, optical drive, FLASH memory), and a main memory 116 (e.g., RAM). Software embodiments may be stored in a computer-readable storage medium 110 for reading into a data storage device 114 or main memory 116. In the example of FIG. 1, main memory 116 may be configured to include an antivirus program 200, which is further discussed below.

Figure 2:
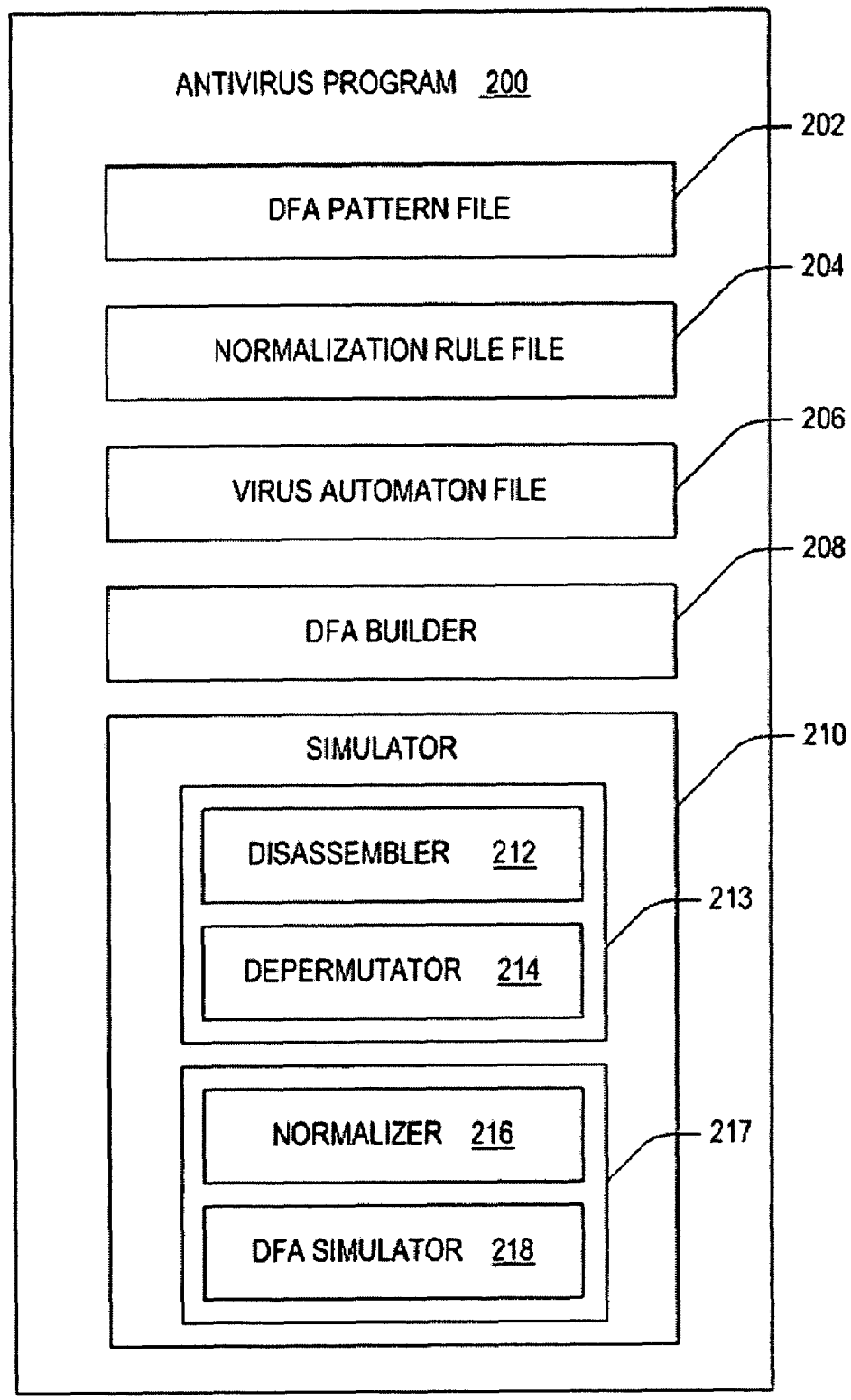
FIG. 2 schematically illustrates the components of an antivirus program in accordance with an embodiment of the present invention.

FIG. 2 illustrates the components of an antivirus program 200 in accordance with an embodiment of the present invention. As shown in FIG. 2, antivirus program 200 may comprise: a DFA pattern file 202 that stores formats used by script-based patterns, where pattern sources may be generated following the formats; a Normalization rules file 204; a virus automaton file 206 that stores a DFA of viruses; a DFA Builder 208 that processes DFA pattern file 202 and Normalization rule file 204 to produce a DFA and store the produced DFA into virus automaton file 206; and a Simulator 210 that scans binary files for malicious content. Simulator 210 may include a Disassembler 212 for converting each byte of a binary file to an assembly code, a Depermutator 214 for connecting subroutines of the binary file by following the converted assembly code if the assembly code is a jump instruction, a Normalizer 216 for disregarding an assembly code if the converted assembly code is a garbage instruction, and a DFA Simulator 218 configured to scan the binary file preprocessed by Disassembler 212, Depermutator 214 and Normalizer 216 to detect virus engines contained in the binary file. The components of antivirus program 200 are further described below. As will be more apparent below, Disassembler 212 and Depermutator 214 may operate simultaneously and, for convenience, may be grouped as Disassembler & Depermutator component 213 as shown in FIG. 2. Likewise, Normalizer 216 and DFA Simulator 218 may be grouped as Normalizer & DFA Simulator component 217.

Figure 3:
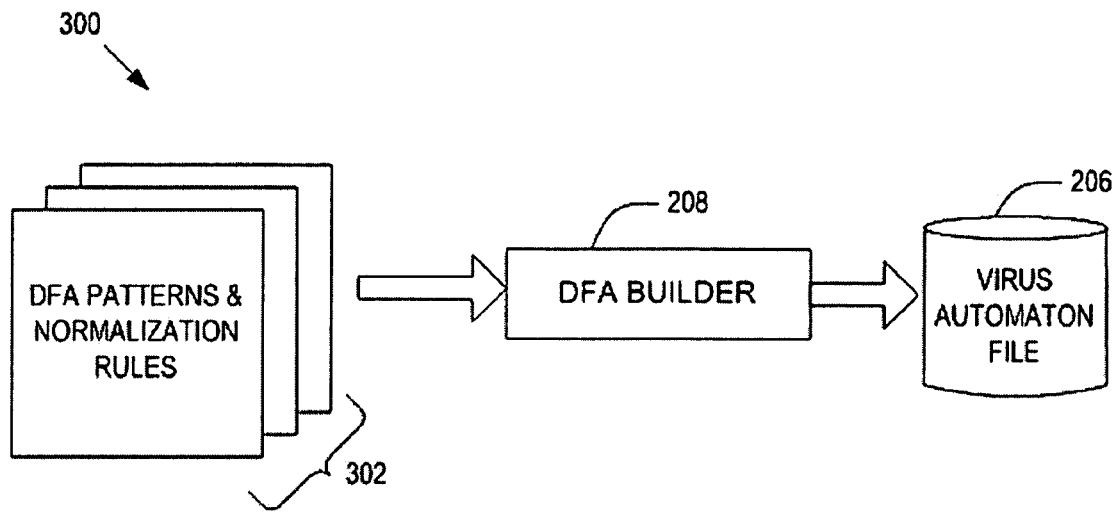
FIG. 3 is a block diagram of a Deterministic Finite Automata (DFA) building system in accordance with an embodiment of the present invention.

FIG. 3 is a block diagram of a DFA building system 300 in accordance with an embodiment of the present invention. In the example of FIG. 3, DFA Builder 208 processes input 302 to produce one or more automatons that may be subsequently stored in virus automaton file 206. In the context of antivirus mechanisms, an "automaton" refers to a set of rules that governs how a particular virus will be detected. In one embodiment, input 302 comprises a DFA pattern source that follows a pattern source format stored in DFA pattern file 202 and rules stored in Normalization rule file 204. Virus automaton file 206 serves as a virus disassembly codes database that may be used to match with disassembly codes derived from a binary file being scanned using simulator 210.

Figure 4:
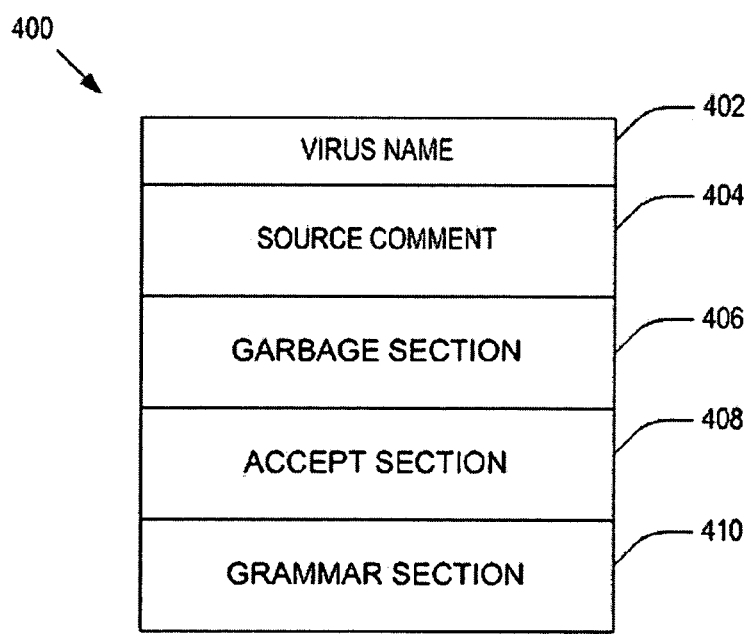
FIG. 4 illustrates a format of a script-based pattern source in accordance with an embodiment of the present invention.

FIG. 4 illustrates a format 400 of a script-based pattern source in accordance with an embodiment of the present invention. One or more pattern sources following format 400 may be stored in DFA pattern file 202. In the example of FIG. 4, format 400 comprises: a virus name 402 (e.g., may be less than 16 characters) that specifies a detection name when the pattern matches a virus engine; a source comment 404 that may start with a semicolon, where DFA Builder 208 ignores source comments during its building process; an optional garbage section 406; a grammar section 410; and an optional accept section 408. The order of sections 402, 404, 406, 408, and 410 may be interchanged without detracting from the merits of the present invention. A pattern source in accordance with format 400 may be written as follows:

```
@VirusName
{
    ;comment
    #garbage
        ASM_LINE
    #accept
        ASM_LINE
    #grammar
        ASM_LINE
}
``` where "ASM_LINE" may comprise one or more lines of assembly code.

Referring to FIG. 4, a pattern source following format 400 may contain normalization information in garbage section 406, as well as information on how to detect the malicious virus engine in accept section 408 and in grammar section 410, where the information may be in the form of a line of assembly code ("assembly line"). Each of sections 406, 408, and 410 may include a set of assembly line entries, where each assembly line entry may be matched with a disassembly code obtained from a binary file being scanned. An assembly line entry may be a line of assembly language instruction comprising an op-code name and one or more operands. For example, in the Microsoft Windows™ environment, an op-code may be a Win32 assembly instruction and, in one embodiment, an operand may be exact, wildcard, or variable. That is, an operand may be:

(1) Exact—specifies the exact operand to match. One example may be
PUSH EAX
This assembly line specifies that PUSH instruction must be followed by operand EAX.

(2) Wildcard—specifies the general type of operand. Examples may be
PUSH reg32
MOV reg, imm
For the first assembly line, the PUSH instruction must be present together with any 32-bit register. The second assembly line requires that the MOV instruction op-code is present with any register as the first operand and any immediate value as the second operand.

(3) Variable—specifies that information on an operand may be stored in a variable and later retrieved for matching. One example may be
DEC reg32_varset1
PUSH reg_var1
While matching, the DEC op-code must be present on the first assembly line with any 32-bit register as the operand and set register variable 1 to this register type. For the next assembly line, the PUSH op-code must match and the operand register and must also match the retrieved value of register variable 1.

In wildcard instructions, the op-code and the operand may vary. Possible values for a register operand may be REG, REG8, REG16 and REG32. Possible values for immediate operand may be IMM, IMM16 and IMM32. For memory operands, MEM, Mem16 and Mem32 may be the possible values. Assembly instructions may be associated through operators, such as a star (*), plus (+), question mark (?), and explicit dot (.) operators, for example.

As mentioned, Disassembler 212 may convert each byte of a binary file to a disassembly code. Then, each converted disassembly code may be matched first with assembly line entries in garbage section 406. If there is a match, the disassembly code may not be processed by grammar section 410, and the set of states of a DFA defined by grammar section 410 remains unchanged.

Construction of a DFA using grammar section 410 is further described below. If the disassembly code does not match any assembly line entry in garbage section 406, the disassembly code may be processed using grammar section 410. Note that garbage section 406 is used to "normalize" the disassembly code before moving on to grammar section 410. Garbage section 406 advantageously allows the virus scanner to ignore do-nothing loops and similar useless viral codes that tend to foil conventional scanners.

Grammar section 410 contains virus pattern information in regular expression format. When the virus pattern is compiled using DFA builder 208, the regular expression may be constructed into a transition table that specifies the next set of states of DFA for a given input symbol, which in this case is a disassembly code. When the disassembly code is rejected by grammar section 410, assembly line entries in accept section 408 may be processed. If there is a match, the state of DFA may be toggled back as if the disassembly code is not rejected at all and the set of DFA states remain unchanged.

Figure 5:
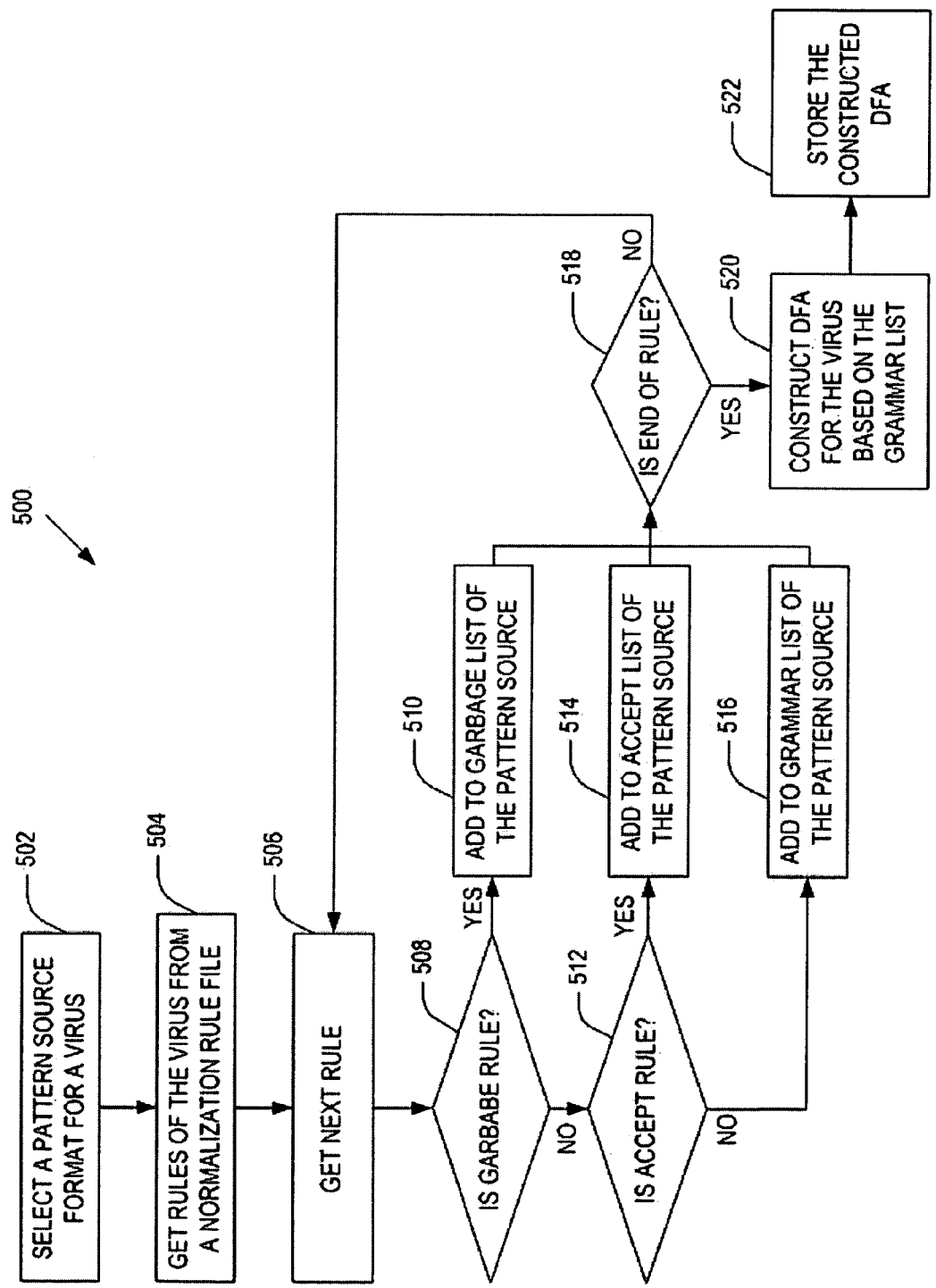
FIG. 5 is a flow chart illustrating exemplary steps of building an automaton of a virus in accordance with an embodiment of the present invention.

FIG. 5 shows a flow chart 500 illustrating exemplary steps of building a Deterministic Finite Automata (DFA) for a virus scanner in accordance with an embodiment of the present invention. In steps 502 and 504, DFA Builder 208 selects a DFA pattern source format from DFA pattern file 202 and gets rules for a virus from Normalization rule file 204, where each rule may be an assembly line. Steps 506, 508, 510, 512, 514, 516, and 518 represent a process for grouping the rules and storing each group to a garbage section 406, an accept section 408, or grammar section 410. Each and every one of the rules may be selected and checked if the rule is a garbage instruction in step 508. In step 510, the rule may be stored in garbage section 406 if the rule is a garbage instruction. If the rule is determined to be an accept instruction in step 512, it may be stored in accept section 408 in step 514. If the rule is neither a garbage instruction nor an accept instruction, it may be stored in grammar section 410 in step 516. Upon completion of the step of grouping the rules in step 518, a DFA for the virus may be constructed based on the grammar section 410 in step 520. The DFA for the virus may be stored in virus automaton file 206 in step 522.

In general, construction of a DFA from a regular expression is well known in the art. For example, Aho et al., in the incorporated reference "Compilers: Principles, Techniques, and Tools," teach an algorithm for DFA construction. In the interest of clarity, only relevant steps are described in the following sections. Despite its space requirements, DFA is chosen because of its advantage of recognizing grammar faster than Non-deterministic Finite Automata (NFA).

Construction of the DFA in step 520 may be performed during the compilation of the pattern, which in this example follows format 400 shown in FIG. 4. A pattern may be assigned a pattern index or id. The pattern index or id may be based on the order they appear in the pattern source and may be referred to by computer-readable program codes. Those read by humans, such as a debug log, may always refer to the name of the virus indicated in virus name 402 (see FIG. 4) and not the pattern id, for example.

Conversion To Assembly Line Equivalent: The first step of constructing a DFA in step 520 may be converting an assembly line into its internal operand flag equivalent. A unique assembly line may be assigned a new alphabet id. This alphabet id may be stored in a separate pool that all the patterns can share. As mentioned, an assembly line may have one op-code and two operands. Thus, the internal operand flag equivalent (also referred to as "assembly line equivalent") may be presented by one op-code id and two op-flags for two operands, where op-code id and two op-flags may be represented by a two-byte short integer and two four-byte long integers, respectively. An assembly line equivalent stores the information about the assembly line to be matched with disassembly codes derived from a binary file being scanned. The op-code id may be the op-code assignment used internally for comparing the op-code of a disassembly code. The op-flag can match exact operand value or even wildcards. It can also specify to set variables or compare the contents of the variable previously stored.

The alphabet used by the patterns may be listed at the end of a debug log in an alphabet section. The alphabet id may be indicated by 4-digit decimal enclosed in a bracket. For example, an alphabet ID "[0001]" may represent MOV EAX, EAX.

Conversion to Postfix: After assembly line entries in grammar section 410 have been converted to assembly line equivalents, the regular expression may be converted into its postfix-form before building a syntax-tree. Since the infix may be a regular expression, operators and its precedence should be noted. A concatenation operator can be inserted in the expression by checking combinations of operands/operators. Error in combination in the expression may be also be checked. A unique right-end marker # may be concatenated to the regular expression, as shown in Table 1.

TABLE 1

| Previous | * | + | ? | \| | . | ) | ( | Op |
|---|---|---|---|---|---|---|---|---|
| * | E | E | E | Ok | Ok | Ok | CAT | CAT |
| + | E | E | E | Ok | Ok | Ok | CAT | CAT |
| ? | E | E | E | Ok | Ok | Ok | CAT | CAT |
| \| | E | E | E | E | E | E | Ok | Ok |
| . | E | E | E | E | E | E | Ok | Ok |
| ) | Ok | Ok | Ok | Ok | Ok | Ok | CAT | CAT |
| ( | E | E | E | E | E | E | Ok | Ok |
| Op | Ok | Ok | Ok | Ok | Ok | Ok | CAT | CAT |

The infix expression may be processed as follows:
1. If the infix item is "(", push the item in the stack.
2. IF the infix item is an operand, copy it directly to postfix string.
3. If the infix item is ")", pop the item in the stack and copy it to the postfix string until the matching "(" is encountered. Parenthesis pairs are not copied in the postfix string.
4. If the infix item is an operator, the precedence of the operator may be checked with the item on the top of the stack. While the precedence of the operator is less than or equal to the item on the top of stack, the item is popped and copied in the postfix string.

Building the Syntax-Tree: Syntax-tree can be constructed from a postfix. A postfix may be evaluated using a stack and processed as follows
1. If the postfix item is an operand, push its tree item in the stack.
2. If the postfix item is a unary operator ("*", "+", "?"), pop a tree item from the stack. Assign this item to be child of the current tree item. Push the current tree item in the stack.
3. If the postfix item is an operator (CAT or |), pop item and set it as the right node of the current item. Pop another item and set it as left node. Push the current item.

After the entire postfix item has been processed, the stack should only contain the root tree item.

Computation of "Followpos": The function followpos(i) indicates what positions can follow position "i" in the syntax tree. Types of followpos functions are:
1. nullable(n)—true if can generate an empty string.
2. firstpos(n)—gives the set of positions that can match the first symbol of a string generated by the sub-expression rooted at n.
3. lastpos(n)—gives the set of positions that can match the last symbol of a string.

Rules for computing nullable, firstpos and lastpos are shown in Table 2.

TABLE 2

| NODE n | nullable(n) | Firstpos(n) | Lastpos(n) |
|---|---|---|---|
| N is a leaf labeled ε | True | Ø | Ø |
| N is a leaf labeled with position I | False | {I} | {I} |
| c1\|c2 | nullable(c1) or nullable(c2) | firstpos(c1) U firstpos(c2) | lastpos(c1) U lastpos(c2) |
| c1.c2 | nullable(c1) and nullable(c2) | If nullable(c1) then firstpos(c1) U firstpos(c2) else firstpos(c1) | If nullable(c2) then lastpos(c1) U lastpost(c2) else lastpos(c2) |
| c1* | True | firstpos(c1) | lastpos(c1) |

TABLE 2-continued

| NODE n | nullable(n) | Firstpos(n) | Lastpos(n) |
|---|---|---|---|
| c1+ | False | firstpos(c1) | lastpos(c1) |
| c1? | True | firstpos(c1) | lastpos(c1) |

Two rules define all the ways one position can follow another:
1. If n is a cat-node with left child c1 and right child c2, and "i" is a position in lastpos(c1), then all positions in firstpos(c2) are in followpos(i).
2. If n is a star-node or a plus-node, and "i" is a position in lastpos(n), then all positions n firstpos(n) are in followpos(i).

Construction of Transition Table: The final step of constructing a DFA may be generating Dstates, the set of states of D and Dtran, the transition table for D by the following procedure:

```
Initially, the only unmarked state in Dstate is firstpos(root), where
root is the root of the syntax tree for (r)#;
While there is an unmarked state T in Dstate do begin
    Mark T;
    For each input symbol a do begin
        let U be the set of positions that are in followpos(p) for
        some position p in T, such that the symbol at position p
        is a;
        If U is not empty and is not in Dstates then
            Add U as an unmarked Dstates;
        Dtran[T,a]; = U;
    end
end
```

The states in Dstates are sets of positions; initially, each state may be "unmarked," and a state becomes "marked" just before we consider its out-transitions. The start state of D may be firstpos(root), and the accepting states may be all those containing the position associated with end marker #.

Figure 6:
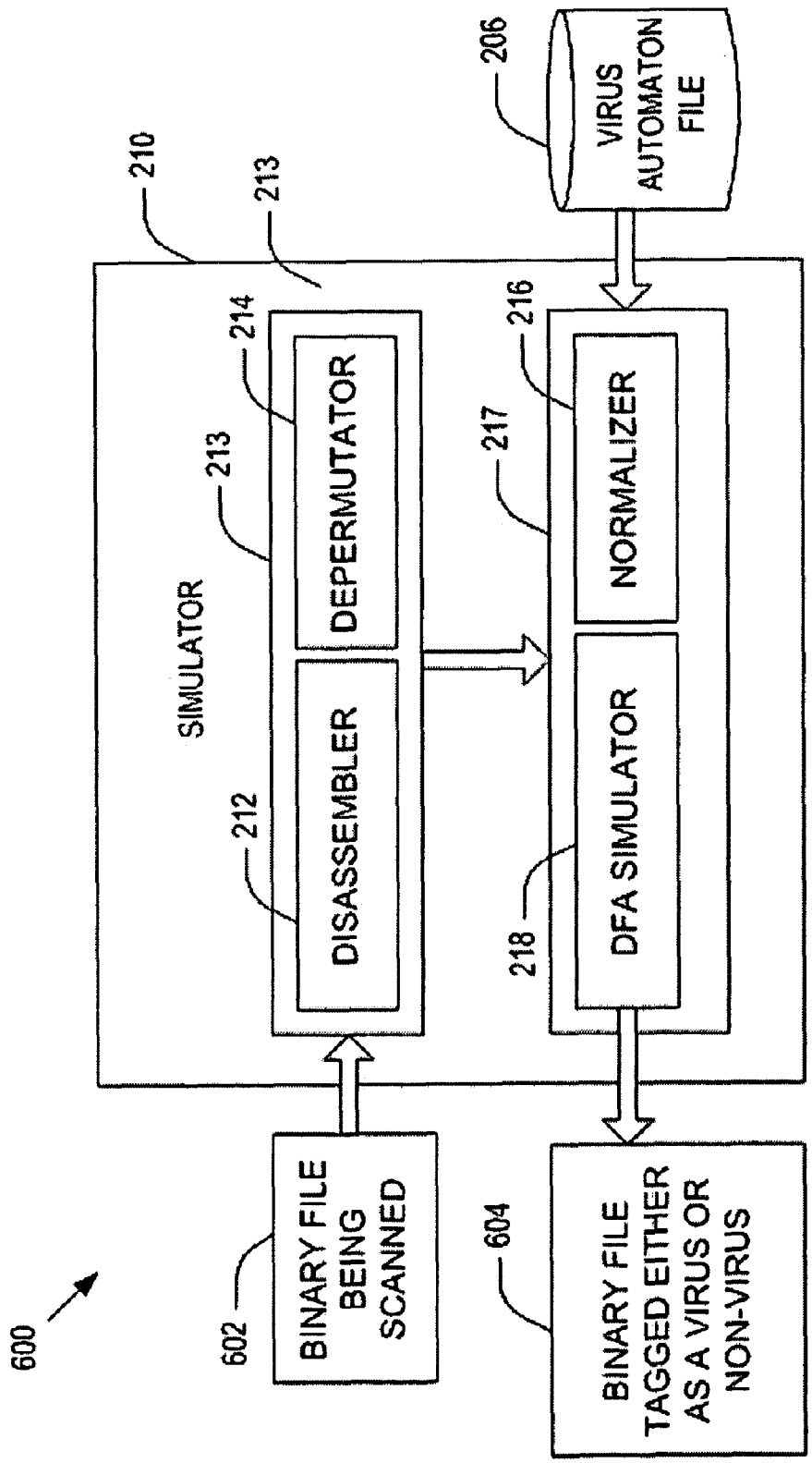
FIG. 6 is a block diagram of a virus simulation system in accordance with an embodiment of the present invention.

FIG. 6 shows a block diagram of a virus simulation system 600 in accordance with an embodiment of the present invention. As illustrated in FIG. 6, a binary file being scanned 602 may be processed by Disassembler & Depermutator component 213 that comprises Disassembler 212 and Depermutator 214. Binary file 602 may be converted from binary code to disassembly code by Disassembler 212. Then, Depermutator 214 connects the subroutine of the permutated virus using the converted disassembly code. The processing steps taken by Disassembler & Depermutator component 213 are further described in the flow chart 700 of FIG. 7A.

Still referring to FIG. 6, output from Disassembler & Depermutator component 213 and a pattern source including DFA from virus automaton file 206 may be input to Normalizer & DFA Simulator component 217 to complete the scanning of the binary file for virus engine and tag the binary file 604 either as a containing or not containing a virus. Normalizer & DFA Simulator component 217 may comprise a Normalizer 216 and a DFA simulator 218. The processing steps taken by Normalizer 216 and DFA simulator 218 are further described by the flowcharts of FIGS. 7B and 7C, respectively.

Figure 7A:
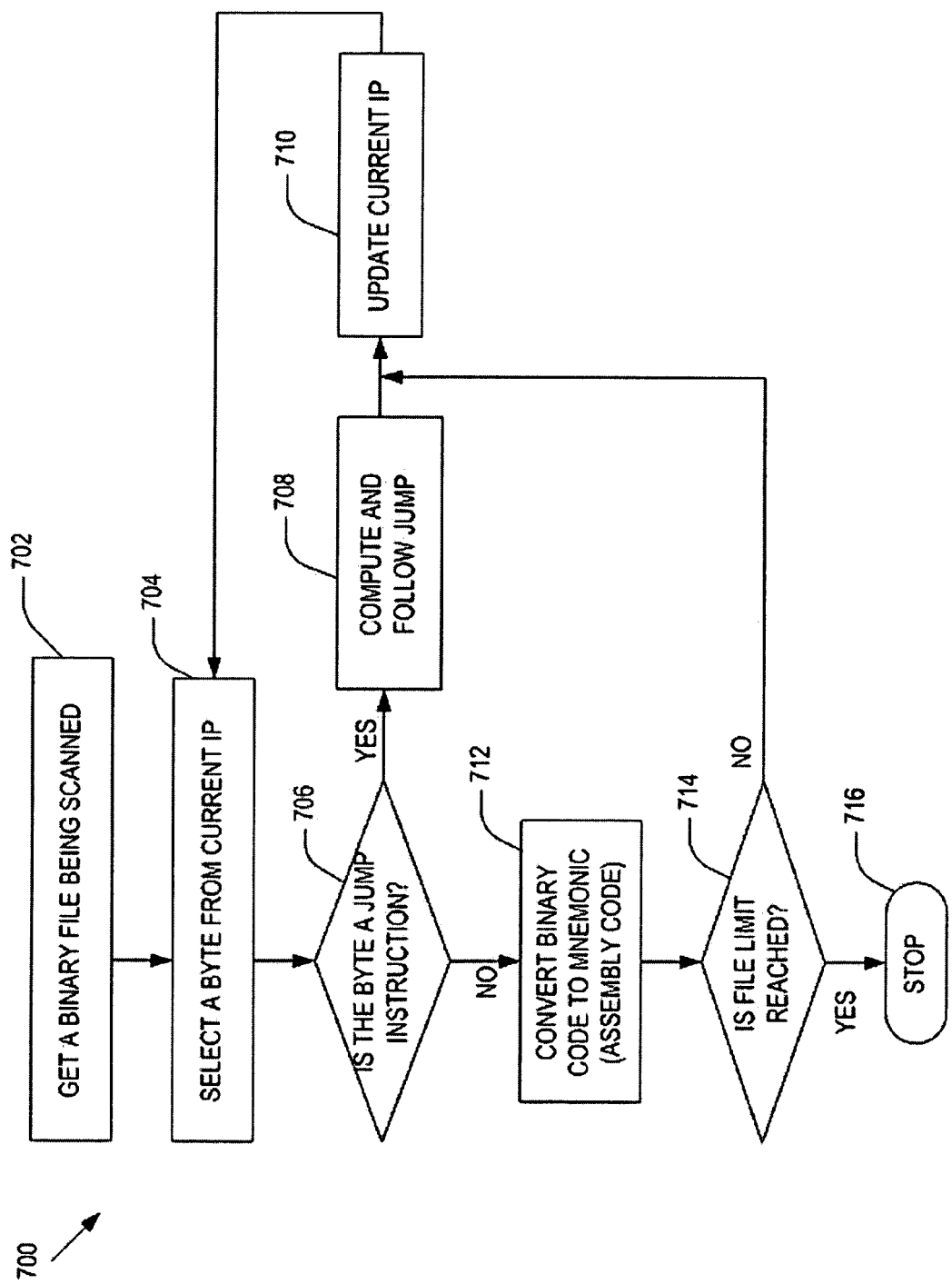
FIG. 7A is a flow chart illustrating exemplary procedures of a Disassembler & Depermutator component in accordance with an embodiment of the present invention.

FIG. 7A shows a flowchart 700 illustrating exemplary procedures of Disassembler & Depermutator 213 in accordance with an embodiment of the present invention. As illustrated in FIG. 7A, a binary file being scanned (see 602 in FIG. 6) may be input to Disassembler 212 in step 702. Next, Disassembler 212 reads a byte from the current Instance Pointer (IP) and determines if the byte is a jump instruction in steps 704 and 706, respectively. Upon negative response to step 706, Disassembler 212 converts the byte into an assembly code in step 712. Next, in step 714, current IP may be checked if it points to the end of file. Upon positive response to step 714, the process terminates in step 716. Otherwise, the current IP may be updated in step 710 and the next byte from the binary file being scanned may be read from the binary file in step 704.

If the determination at step 706 is positive, Depermutator 214 computes the jump instruction and follows the jump to connect the subroutines of the binary file in step 708. Next, the current IP may be updated in step 710 and next byte may be read from the binary file in step 704.

Figure 7B:
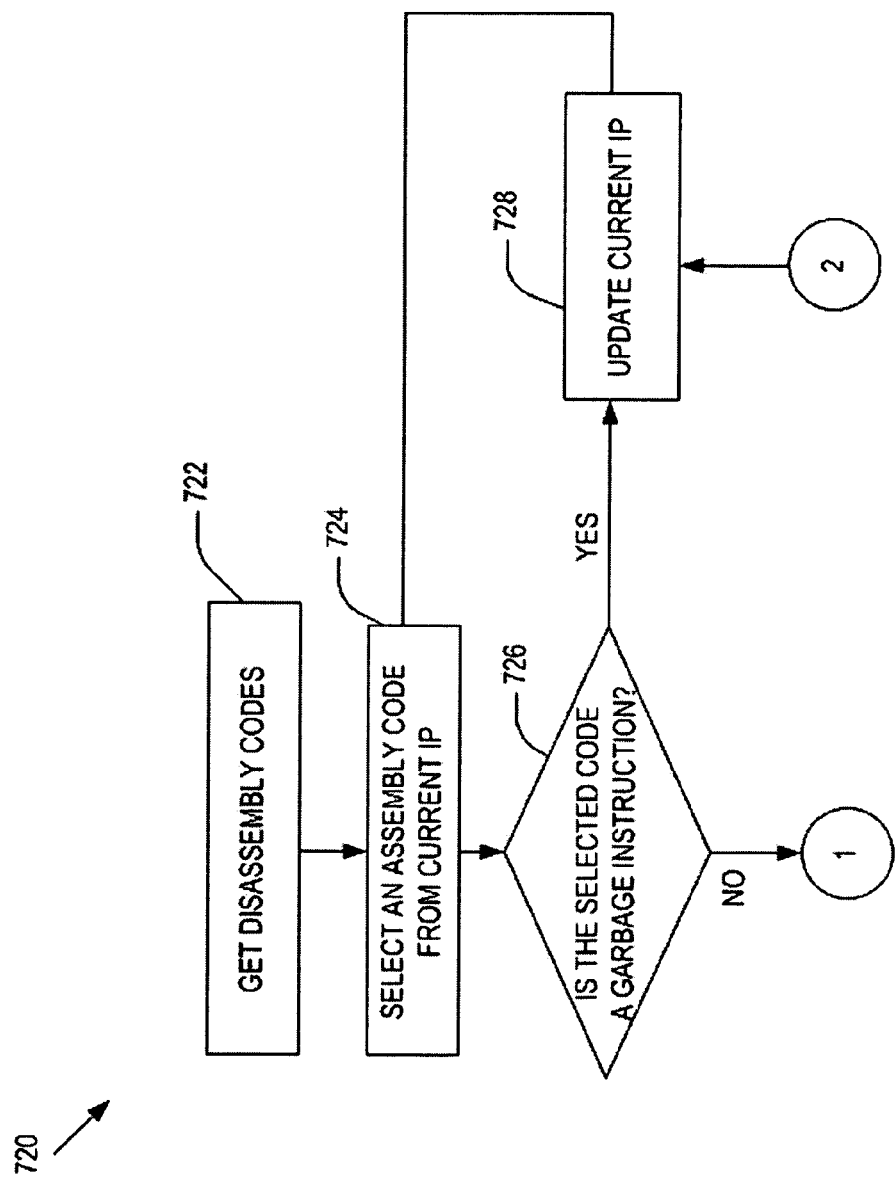
FIG. 7B is a flow chart illustrating exemplary procedures of a Normalizer in accordance with an embodiment of the present invention.

FIG. 7B shows a flow chart 720 illustrating exemplary procedures of Normalizer 216 in accordance with an embodiment of the present invention. As illustrated in FIG. 7B, Normalizer 216 gets disassembly codes that may be output from Disassembler & Depermutator component 213 in step 722. Next, one of the disassembly codes may be selected from the current IP in step 724. Subsequently, the selected disassembly code may be matched with assembly line entries of the garbage section of the pattern source to check if it is a garbage instruction in step 726. If answer to the step 726 is YES, the current IP may be updated in step 728 and the next disassembly code may be selected in step 724. Otherwise, the selected disassembly code may be passed to DFA Simulator 218 for processing the steps illustrated in FIG. 7C.

Figure 7C:
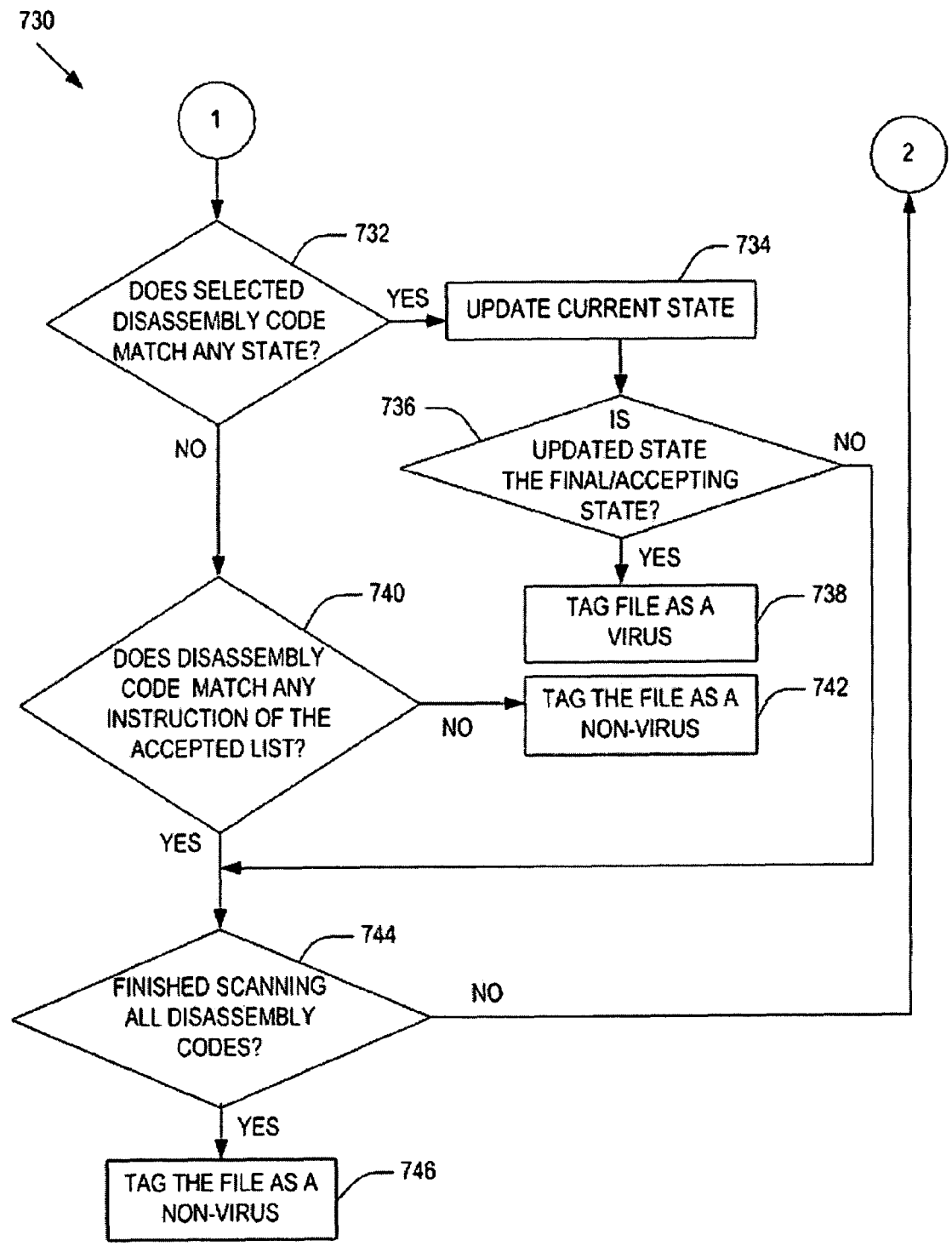
FIG. 7C is a flow chart illustrating exemplary procedures of a DFA Simulator in accordance with an embodiment of the present invention.

FIG. 7C is a flowchart 730 illustrating exemplary procedures of DFA Simulator 218 in accordance with an embodiment of the present invention. The NO branch of decision diamond 726 in FIG. 7B proceeds to step 732 in which the selected disassembly code may be tested if it matches any state of DFA. Upon positive response to the step 732, DFA state may be updated in step 734 and checked if the updated state is final/accepting state in step 736. If the answer to step 736 is positive, the binary file may be tagged as a virus in step 738. Otherwise, the process proceeds to decision diamond 744 in which DFA Simulator 218 examines whether all of the disassembly codes have been scanned. Upon positive response to step 744, the binary file may be tagged as a non-virus. Otherwise, the process proceeds to operational block 728 of FIG. 7B.

Referring back to step 732, the NO branch from decision diamond 732 proceeds to decision diamond 740 in which the selected disassembly code may be tested if it matches any instruction of accepted section of the pattern source. Upon negative response to step 740, the file may be tagged as a non-virus and the process terminates. Otherwise, the process proceeds to step 744.

While specific embodiments of the present invention have been provided, it is to be understood that these embodiments are for illustration purposes and not limiting. Many additional embodiments will be apparent to persons of ordinary skill in the art reading this disclosure.

What is claimed is:
1. A computer including a processor for running computer-readable program code stored in memory, comprising:
   a deterministic finite automaton (DFA) pattern file comprising at least one pattern;
   a normalization rule file comprising a plurality of rules, each rule corresponding to an assembly instruction;
   an automaton file comprising automata of known viruses;

a DFA builder configured to build the automata using the at least one pattern and the plurality of rules and store the automata into the automaton file; and a Simulator, comprising:

a disassembler configured to convert each byte of a binary file to an assembly code;

a depermutator configured to connect subroutines of the binary file by following the assembly code if the assembly code is a jump instruction;

a normalizer configured to disregard the assembly code if the assembly code is a garbage instruction; and a DFA simulator configured to scan the binary file using a plurality of input symbols derived from the binary file and the automata stored in the automaton file.

2. The computer of claim 1, wherein said at least one pattern comprises a virus name, a source comment and a grammar section.

3. The computer of claim 2, wherein said DFA builder is configured to ignore said comment section during a building process.

4. The computer of claim 3, wherein said at least one pattern further comprises a garbage section, an accept section or both.

5. The computer of claim 4, wherein each of said garbage, grammar and accept sections comprises a set of assembly lines, each of said set of assembly lines corresponding to one of the plurality of rules, respectively.

6. The computer of claim 5, wherein each of said set of assembly lines comprises an op-code that corresponds to an assembly instruction.

7. The computer of claim 6, wherein each of said set of assembly lines further comprises one or more operands.

8. The computer of claim 7, wherein said one or more operands are general type operands.

9. The computer of claim 7, wherein said one or more operands specify information that is stored to variables and retrieved later for matching.

10. The computer of claim 1, wherein each of the plurality of input symbols is an assembly code.

\* \* \* \* \*